(12) United States Patent
Meshkin Fam et al.

(10) Patent No.: US 11,988,158 B2
(45) Date of Patent: May 21, 2024

(54) MULTI-FUEL ENGINE FOR AN AIRCRAFT

(71) Applicant: Pratt & Whitney Canada Corp., Longueuil (CA)

(72) Inventors: Ezzat Meshkin Fam, Mississauga (CA); Xuening Lu, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 49 days.

(21) Appl. No.: 17/379,532

(22) Filed: Jul. 19, 2021

(65) Prior Publication Data

US 2023/0015930 A1    Jan. 19, 2023

(51) Int. Cl.
*F02C 9/40* (2006.01)
*B64D 37/30* (2006.01)
*F02C 7/236* (2006.01)

(52) U.S. Cl.
CPC ............... *F02C 9/40* (2013.01); *B64D 37/30* (2013.01); *F02C 7/236* (2013.01)

(58) Field of Classification Search
CPC ............ F02C 9/40; F02C 7/236; B64D 37/30
See application file for complete search history.

(56) References Cited

U.S. PATENT DOCUMENTS

| | | | |
|---|---|---|---|
| 3,382,672 A | 5/1968 | French | |
| 3,866,108 A * | 2/1975 | Yannone | F02C 9/40 322/14 |
| 3,991,561 A | 11/1976 | Leto | |
| 4,761,948 A * | 8/1988 | Sood | F23R 3/36 60/39.463 |
| 8,616,002 B2 | 12/2013 | Kraemer | |
| 9,567,101 B2 | 2/2017 | Swann | |
| 2006/0119202 A1* | 6/2006 | Kataoka | F02C 7/08 310/152 |
| 2009/0107105 A1* | 4/2009 | Ziminsky | F23R 3/36 60/39.463 |
| 2011/0289932 A1* | 12/2011 | Thompson | F02C 3/30 60/776 |
| 2012/0036863 A1* | 2/2012 | Kirzhner | F02C 7/22 60/776 |
| 2012/0232768 A1* | 9/2012 | Nenmeni | F02C 7/232 701/99 |
| 2012/0271527 A1* | 10/2012 | Zebrowski | F02C 7/228 60/776 |
| 2013/0086918 A1* | 4/2013 | Bothien | F02C 9/40 60/776 |
| 2013/0192246 A1* | 8/2013 | Kamath | F23R 3/36 60/776 |

(Continued)

FOREIGN PATENT DOCUMENTS

WO    2020079419 A1    4/2020

OTHER PUBLICATIONS

EP search report for EP22185868.1 dated Jan. 2, 2023.

*Primary Examiner* — David P. Olynick
(74) *Attorney, Agent, or Firm* — Getz Balich LLC

(57) ABSTRACT

A method is provided for operating an aircraft system. During this method, an engine is operated using first fuel provided by a first fuel source. A fuel supply for the engine is switched between the first fuel source and a second fuel source, where the switching of the fuel supply includes shutting down the engine during aircraft flight. The engine is operated using second fuel provided by the second fuel source.

20 Claims, 8 Drawing Sheets

(56) References Cited

U.S. PATENT DOCUMENTS

| | | | |
|---|---|---|---|
| 2014/0157785 A1* | 6/2014 | Bathina | F02C 9/40 |
| | | | 60/737 |
| 2015/0089921 A1 | 4/2015 | Rideau | |
| 2015/0100220 A1* | 4/2015 | Swann | F02C 9/28 |
| | | | 701/100 |
| 2015/0284102 A1 | 10/2015 | Swann | |
| 2015/0344145 A1* | 12/2015 | Epstein | F17C 3/00 |
| | | | 244/135 C |
| 2017/0363004 A1* | 12/2017 | Xu | F23R 3/283 |
| 2019/0056114 A1* | 2/2019 | Danis | F02C 7/228 |
| 2021/0394892 A1* | 12/2021 | Dumur | B64C 19/00 |
| 2022/0316410 A1* | 10/2022 | Swann | B60L 50/70 |

\* cited by examiner

MULTI-FUEL ENGINE FOR AN AIRCRAFT

BACKGROUND OF THE DISCLOSURE

1. Technical Field

This disclosure relates generally to an aircraft and, more particularly, to fuel delivery to one or more engines of the aircraft.

2. Background Information

A gas turbine engine may be operated using multiple fuels. However, such a gas turbine engine may need to be manually reconfigured by technicians to switch between different fuel sources. For example, one fuel system may be unplugged while another fuel system is plugged in. There is a need in the art for systems and methods for switching between different fuel sources during, for example, aircraft operation.

SUMMARY OF THE DISCLOSURE

According to an aspect of the present disclosure, a method is provided for operating an aircraft system. During this method, an engine is operated using first fuel provided by a first fuel source. A fuel supply for the engine is switched between the first fuel source and a second fuel source, where the switching of the fuel supply includes shutting down the engine during aircraft flight. The engine is operated using second fuel provided by the second fuel source.

According to another aspect of the present disclosure, another method is provided for operating an aircraft system. During this method, a first engine is operated. A second engine is operated using first fuel provided by a first fuel source. A fuel supply for the second engine is switched between the first fuel source and a second fuel source while the first engine is operating. The second engine is operated using second fuel provided by the second fuel source.

According to still another aspect of the present disclosure, a system is provided for an aircraft. This aircraft system includes an engine and a fuel system for the engine. The engine includes a combustion section. The fuel system includes a first fuel source and a second fuel source. The fuel system is configured to: direct first fuel from the first fuel source to the combustion section for combustion; switch a fuel supply for the engine from the first fuel source to the second fuel source while the engine is shut down during flight of the aircraft; and direct second fuel from the second fuel source to the combustion section for combustion.

The fuel system may also include a purge fluid source. The fuel system may also be configured to purge at least some of the first fuel using purge fluid from the purge fluid source.

The aircraft system may also include a second engine. The fuel system may be configured to switch the fuel supply for the engine while the second engine provides forward thrust for the aircraft.

The switching of the fuel supply for the second engine may be performed while the first engine is operating using the first fuel.

The switching of the fuel supply for the second engine may include shutting down the second engine during aircraft flight.

The engine may be part of an aircraft propulsion system.

During the method, a second engine may be operated. The switching of the fuel supply for the engine may be performed while the second engine is operating.

The switching of the fuel supply may include: operating a first flow regulator to stop flow of the first fuel from the first fuel source; and operating a second flow regulator to start flow of the second fuel from the second fuel source.

The switching of the fuel supply may also include igniting the second fuel within a combustor of the engine.

The switching of the fuel supply may also include purging the first fuel from one or more components of the engine using a purge fluid that is different than the second fuel.

The purge fluid may be or otherwise include inert gas.

The shutting down of the engine may include extinguishing a flame within a combustor of the engine.

One of the first fuel or the second fuel may be or otherwise include gaseous fuel. The other of the first fuel or the second fuel may be or otherwise include liquid fuel.

One of the first fuel or the second fuel may be or otherwise include non-hydrocarbon fuel. The other of the first fuel or the second fuel may be or otherwise include hydrocarbon fuel.

The first fuel or the second fuel may be or otherwise include hydrogen fuel.

The switching of the fuel supply may be initiated by an operator.

The switching of the fuel supply may be initiated by a controller.

The switching of the fuel supply may include: restarting the engine concurrently using the first fuel and the second fuel; and stopping flow of the first fuel following the restarting of the engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
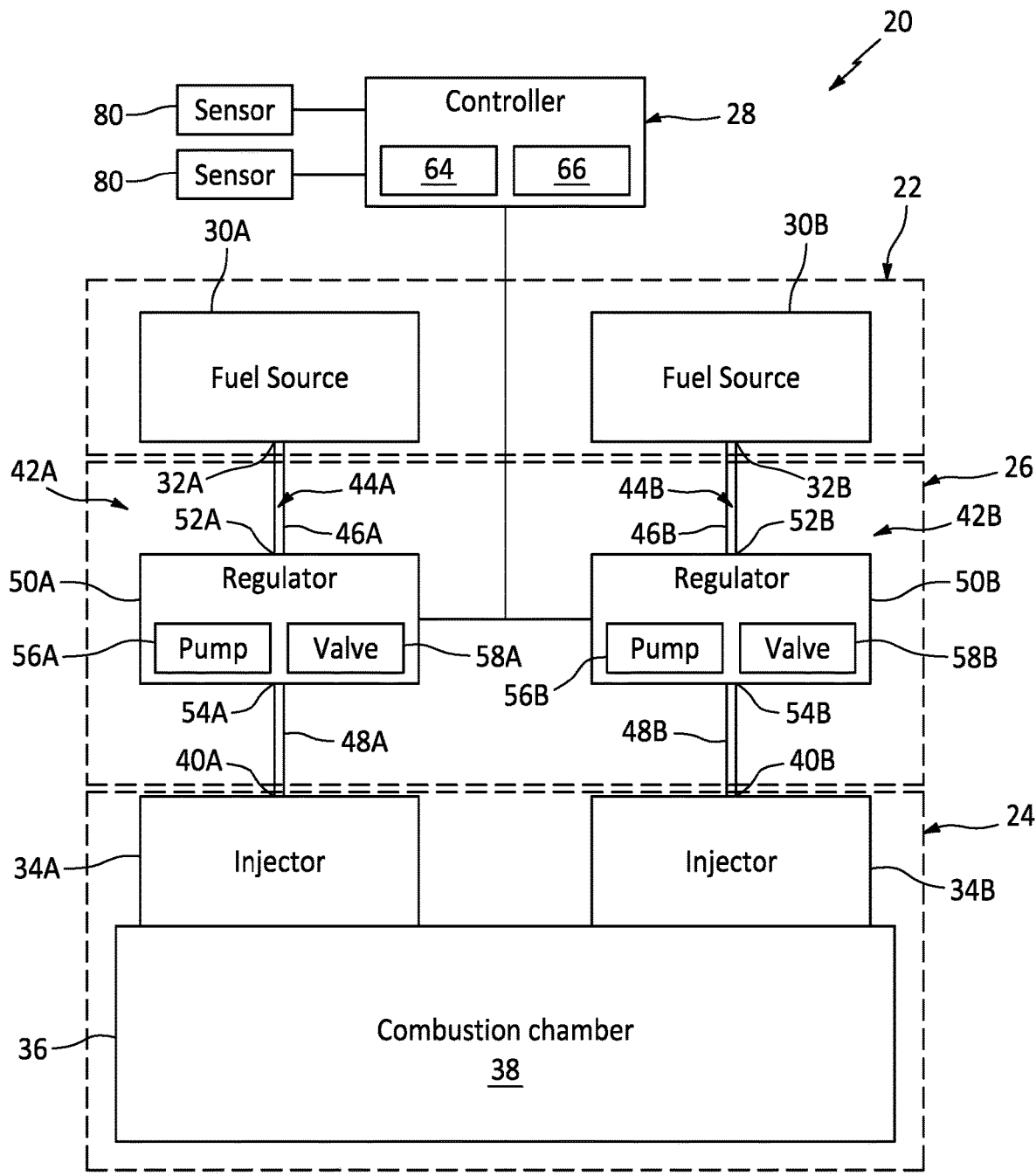
FIG. 1 is a schematic illustration of a system for an aircraft.

FIG. 1 illustrates a system 20 for an aircraft such as an airplane, a helicopter, an unmanned drone or any other type of aircraft. The aircraft system 20 of FIG. 1 includes a fuel supply 22 for an engine, a combustion section 24 of the engine and a fuel system 26 for the engine. The aircraft system 20 of FIG. 1 also includes a controller 28.

For ease of description, the engine is described below as a gas turbine engine. This turbine engine may be configured as a turbofan turbine engine, a turbojet turbine engine, a turboprop turbine engine or a turboshaft turbine engine. The present disclosure, however, is not limited to the foregoing exemplary turbine engines. Furthermore, the present disclosure is not limited to turbine engine applications. For example, the engine may alternatively be configured as an internal combustion (IC) engine such as a piston engine or a rotary engine.

The fuel supply 22 is configured as a multi-fuel supply; e.g., a dual-fuel supply. The fuel supply 22 of FIG. 1, for example, includes a first fuel source 30A and a second fuel source 30B.

The first fuel source 30A is configured to provide first fuel to the fuel system 26 and the engine. The first fuel source 30A may also be configured to contain and hold a quantity of the first fuel prior to, during and/or after engine operation. The first fuel source 30A, for example, may be configured as a first fuel reservoir such as a container; e.g., a tank, a cylinder, a pressure vessel, a bladder, etc. The first fuel source 30A of FIG. 1 includes a first fuel source outlet 32A.

The second fuel source 30B is configured to provide second fuel to the fuel system 26 and the engine. The second fuel source 30B may also be configured to contain and hold a quantity of the second fuel prior to, during and/or after engine operation. The second fuel source 30B, for example, may be configured as a second fuel reservoir such as a container; e.g., a tank, a cylinder, a pressure vessel, a bladder, etc. The second fuel source 30B of FIG. 1 includes a second fuel source outlet 32B.

The combustion section 24 is configured to facilitate combustion within the engine. The combustion section 24 of FIG. 1, for example, includes one or more fuel injectors 34A and 34B (generally referred to as "34") and a combustor 36 with an internal combustion chamber 38. The fuel injectors 34 are arranged with the combustor 36. The first fuel injector 34A is configured to inject the first fuel (e.g., into the combustor 36) for mixing with (e.g., compressed) air and subsequent combustion within the combustion chamber 38. The first fuel injector 34A includes a first fuel injector inlet 40A. The second fuel injector 34B is configured to inject the second fuel (e.g., into the combustor 36) for mixing with (e.g., compressed) air and subsequent combustion within the combustion chamber 38. The second fuel injector 34B includes a second fuel injector inlet 40B.

The fuel system 26 is configured to selectively deliver the first fuel from the first fuel source 30A and the second fuel from the second fuel source 30B to the combustion section 24 during aircraft system operation/aircraft operation. The fuel system 26 is also configured to switch the fuel supply 22 for the engine between the first fuel source 30A and the second fuel source 30B during aircraft system operation/aircraft operation. The fuel system 26 of FIG. 1, for example, includes a first fuel circuit 42A and a second fuel circuit 42B. The fuel system 26 may also include the fuel injectors 34.

The first fuel circuit 42A includes at least one first flow passage 44A. This first flow passage 44A of FIG. 1 extends between and is fluidly coupled to the first fuel source outlet 32A and the first fuel injector inlet 40A.

The first flow passage 44A may be formed by one or more fuel conduits; e.g., pipes, hoses, etc. The first flow passage 44A may also or alternatively be formed by one or more internal volumes (e.g., passages, cavities, spaced, bores, etc.) within and/or through one or more other components of the fuel system 26/the engine. The first flow passage 44A of FIG. 1, for example, includes/is formed by a plurality of first fuel conduits 46A and 48A and a first flow regulator 50A.

The upstream first fuel conduit 46A extends between and is fluidly coupled to the first fuel source outlet 32A and an inlet 52A of the first flow regulator 50A. The downstream first fuel conduit 48A extends between and is fluidly coupled to an outlet 54A of the first flow regulator 50A and the first fuel injector inlet 40A.

The first flow regulator 50A is configured to regulate flow of the first fuel through the first fuel circuit 42A. The first flow regulator 50A, for example, may be configured as or otherwise include a first fuel pump 56A and/or a first fuel valve 58A (e.g., a shutoff valve, a flow control valve, etc.). The first flow regulator 50A may thereby regulate the flow of the first fuel from the first fuel source 30A to the first fuel injector 34A.

Figure 2A:
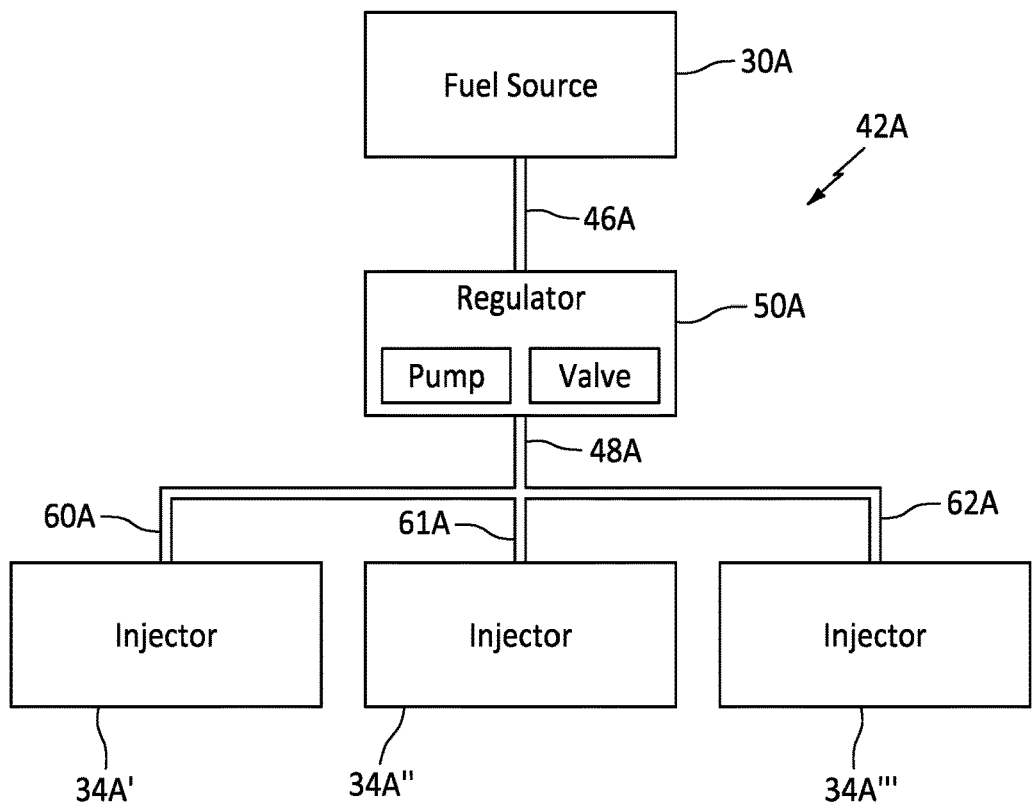
FIGS. 2A and 2B are schematic illustrations of fuel circuits for delivering fuel from a fuel source to a plurality of fuel injectors.

For ease of description, the first fuel circuit 42A is described above and shown in FIG. 1 in a simplified form. In other embodiments, however, the first fuel circuit 42A may also include one or more additional components such as, but not limited to, a fuel filter, a heat exchanger (e.g., a heater), an additional pump, an additional valve, a bypass passage, etc. The first fuel circuit 42A may also or alternatively include more than one flow passage. The first fuel circuit 42A of FIG. 2A, for example, includes a plurality of parallel first flow passages 60A-62A respectively leading, for example, to multiple different first fuel injectors 34A'-34A''' (generally referred to as "34A").

Referring to FIG. 1, the second fuel circuit 42B includes at least one second flow passage 44B. This second flow passage 44B of FIG. 1 extends between and is fluidly coupled to the second fuel source outlet 32B and the second fuel injector inlet 40B.

The second flow passage 44B may be formed by one or more fuel conduits; e.g., pipes, hoses, etc. The second flow passage 44B may also or alternatively be formed by one or more internal volumes (e.g., passages, cavities, spaced, bores, etc.) within and/or through one or more other components of the fuel system 26/the engine. The second flow passage 44B of FIG. 1, for example, includes/is formed by a plurality of second fuel conduits 46B and 48B and a second flow regulator 50B.

The upstream second fuel conduit 46B extends between and is fluidly coupled to the second fuel source outlet 32B and an inlet 52B of the second flow regulator 50B. The downstream second fuel conduit 48B extends between and is fluidly coupled to an outlet 54B of the second flow regulator 50B and the second fuel injector inlet 40B.

The second flow regulator 50B is configured to regulate flow of the second fuel through the second fuel circuit 42B. The second flow regulator 50B, for example, may be configured as or otherwise include a second fuel pump 56B and/or a second fuel valve 58B (e.g., a shutoff valve, a flow control valve, etc.). The second flow regulator 50B may thereby regulate the flow of the second fuel from the second fuel source 30B to the second fuel injector 34B.

Figure 2B:
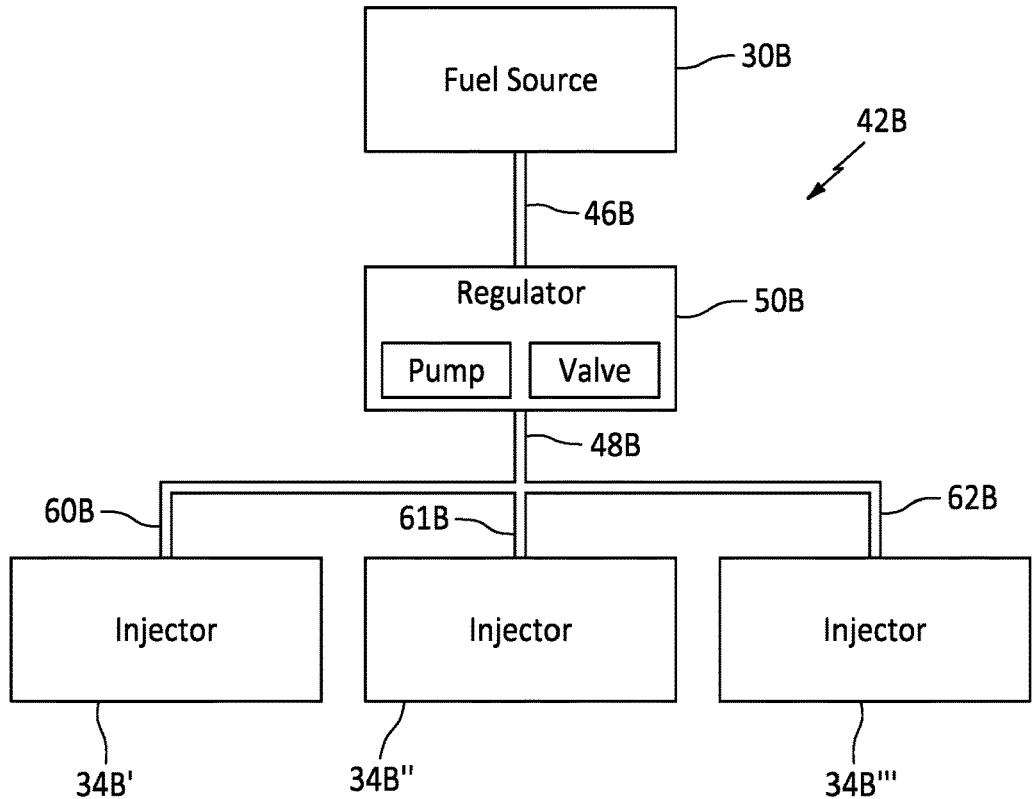

For ease of description, the second fuel circuit 42B is described above and shown in FIG. 1 in a simplified form. In other embodiments, however, the second fuel circuit 42B may also include one or more additional components such as, but not limited to, a fuel filter, a heat exchanger (e.g., a heater), an additional pump, an additional valve, a bypass passage, etc. The second fuel circuit 42B may also or alternatively include more than one flow passage. The second fuel circuit 42B of FIG. 2B, for example, includes a plurality of parallel second flow passages 60B-62B respectively leading, for example, to multiple different second fuel injectors 34B'-34B'" (generally referred to as "34B").

Referring to FIG. 1, the controller 28 is in signal communication with the fuel system 26. The controller 28 of FIG. 1, for example, is hardwired to and/or wirelessly coupled to the first flow regulator 50A and the second flow regulator 50B.

The controller 28 may be configured as an onboard engine controller; e.g., an electronic engine controller (EEC), an electronic control unit (ECU), a full-authority digital engine controller (FADEC), etc. The controller 28 may be implemented with a combination of hardware and software. The hardware may include memory 64 and at least one processing device 66, which processing device 66 may include one or more single-core and/or multi-core processors. The hardware may also or alternatively include analog and/or digital circuitry other than that described above.

The memory 64 is configured to store software (e.g., program instructions) for execution by the processing device 66, which software execution may control and/or facilitate performance of one or more operations such as those described in the methods below. The memory 64 may be a non-transitory computer readable medium. For example, the memory 64 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 3:
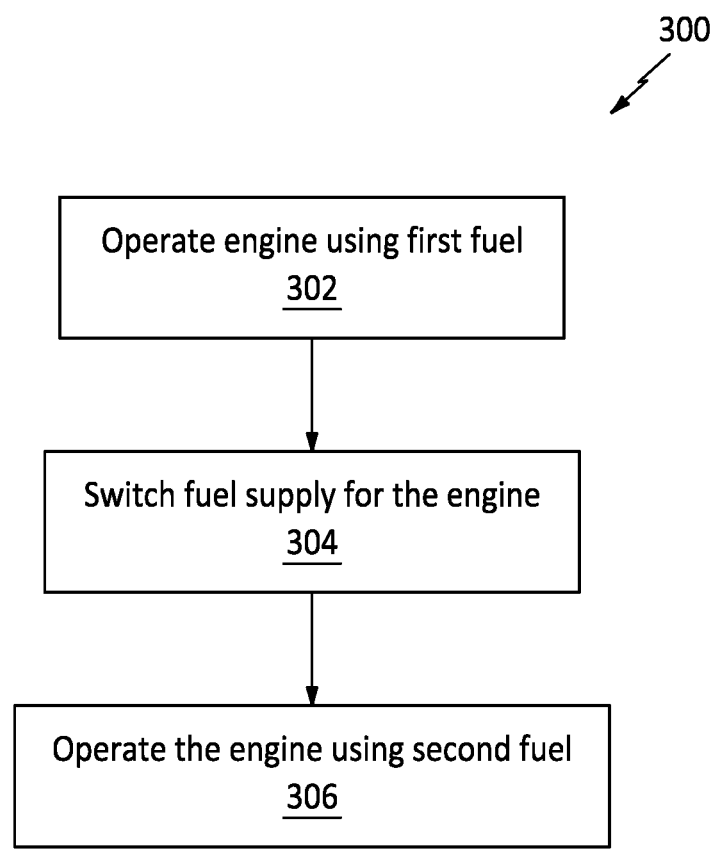
FIG. 3 is a flow diagram of a method for operating the aircraft system.

FIG. 3 is a flow diagram of a method 300 for operating an aircraft system. For ease of description, this method 300 is described below with reference to the aircraft system 20 of FIG. 1. The method 300 is also described below with reference to the first fuel being a non-hydrocarbon fuel and the second fuel being a hydrocarbon fuel. The method 300, however, may alternatively be performed with other aircraft systems and/or use different fuels. For example, the second fuel may alternatively be the non-hydrocarbon fuel and the first fuel may be the hydrocarbon fuel. In another example, the first fuel and the second fuel may each be a non-hydrocarbon fuel or a hydrocarbon fuel where, for example, the first fuel and the second fuel have different chemical compositions and/or phases.

The non-hydrocarbon fuel (e.g., the first fuel) may be hydrogen fuel. The first fuel, for example, may be stored in the first fuel source 30A (e.g., a reservoir) as liquid hydrogen or a mixture of liquid hydrogen and hydrogen gas. At least some or all of the liquid hydrogen may subsequently by vaporized within the first fuel circuit 42A (e.g., via a vaporizer; not shown) to provide hydrogen gas (e.g., $H_2$ gas) to the first fuel injector 34A. The first fuel injector 34A may also or alternatively be configured as a vaporizer. The first fuel injector 34A, for example, may be configured to vaporize at least some or all of the liquid hydrogen prior to or while providing the hydrogen fuel for mixing with the air. Alternatively, the hydrogen fuel may be stored as substantially hydrogen gas within the first fuel source 30A. In such embodiments, the first fuel pump 56A may be omitted where a pressure of the hydrogen ($H_2$) gas stored in the first fuel source 30A is greater than pressure within the combustion chamber 38. Of course, various other types of gaseous and liquid non-hydrocarbon fuels are known in the art, and the present disclosure is not limited to any particular ones thereof.

The hydrocarbon fuel (e.g., the second fuel) may be kerosene or jet fuel. Of course, various other types of gaseous and liquid hydrocarbon fuels are known in the art, and the present disclosure is not limited to any particular ones thereof.

In step 302, the engine is operated using (e.g., only) the first fuel. The controller 28 of FIG. 1 may signal the first flow regulator 50A to direct the first fuel from the first fuel source 30A, through the first fuel circuit 42A and its fuel conduits 46A and 48A, to the first fuel injector 34A. For example, where the first flow regulator 50A includes the first fuel pump 56A, the first fuel pump 56A may draw the first fuel out of the first fuel source 30A through the upstream first fuel conduit 46A and then pump that first fuel through the downstream first fuel conduit 48A to the first fuel injector 34A. Where the first flow regulator 50A also or alternatively includes the first fuel valve 58A, the first fuel valve 58A may be opened such that the first fuel may pass through the first flow regulator 50A as it flows from the first fuel source 30A to the first fuel injector 34A. The opening through the first fuel valve 58A may be adjusted (e.g., opened more or closed more) to meter a flowrate of the first fuel to the first fuel injector 34A.

The first fuel injector 34A may inject the first fuel for mixing with (e.g., compressed) air. The first fuel injector 34A of FIG. 1, for example, may inject the first fuel into the combustion chamber 38. The first fuel-air mixture may be ignited within the combustion chamber 38. As described below in further detail, combustion of the first fuel-air mixture may be converted to provide aircraft thrust. Note, during this first mode of operation (the step 302), the second flow regulator 50B may prevent the second fuel from flowing from the second fuel source 30B to the second fuel injector 34B.

In step 304, the fuel supply 22 for the engine is switched. The fuel system 26, for example, may cease providing the first fuel to the first fuel injector 34A and then (e.g., subsequently) start providing the second fuel to the second fuel injector 34B. The controller 28 of FIG. 1 may signal the first flow regulator 50A to (e.g., gradually or rapidly) stop the flow of the first fuel from the first fuel source 30A to the first fuel injector 34A. Stopping the flow of the first fuel to the first fuel injector 34A and, thus, into the combustion chamber 38 may stop combustion within the now fuel starved combustor 36. A flame within the combustor 36 and its combustion chamber 38 may therefore be extinguished; e.g., the combustor 36 may flame out. The engine and its combustion section 24 may thereby temporarily shut down. It should be noted, however, one or more rotating assemblies of the engine continue to rotate during (e.g., throughout) this temporary flame out/shut down.

Following or during the engine/combustion section shut down, the controller 28 may signal the second flow regulator 50B to direct the second fuel from the second fuel source 30B, through the second fuel circuit 42B and its fuel conduits 46B and 48B, to the second fuel injector 34B. For example, where the second flow regulator 50B includes the second fuel pump 56B, the second fuel pump 56B may draw the second fuel out of the second fuel source 30B through the upstream second fuel conduit 46B and then pump that second fuel through the downstream second fuel conduit 48B to the second fuel injector 34B. Where the second flow regulator 50B also or alternatively includes the second fuel valve 58B, the second fuel valve 58B may be opened such that the second fuel may pass through the second flow regulator 50B as it flows from the second fuel source 30B to the second fuel injector 34B. The opening through the second fuel valve 58B may be adjusted (e.g., opened more or closed more) to meter a flowrate of the second fuel to the second fuel injector 34B.

The second fuel injector 34B may begin to inject the second fuel for mixing with (e.g., compressed) air. The second fuel injector 34B of FIG. 1, for example, may inject the second fuel into the combustion chamber 38. The second fuel-air mixture may be ignited within the combustion chamber 38; e.g., via an igniter. This ignition may restart/reignite (e.g., light) the engine and its combustion section 24. The fuel system 26 may thereby be switched from the first fuel to the second fuel.

The switching step 304 may be performed over a relatively short duration. For example, the switching step 304 may be performed within seconds to a couple of minutes depending on specifics of the engine and its fuel system 26. The engine rotating assemblies may therefore continue to rotate during the temporary flame out/shut down. One or more compressors of the engine may therefore continue to direct compressed air to the combustor 36 and its combustion chamber 38 which may facilitate quicker restarting of the engine/reigniting of the combustor 36.

In step 306, the engine is operated using (e.g., only) the second fuel. The controller 28 of FIG. 1 may continue to signal the second flow regulator 50B to direct the second fuel from the second fuel source 30B, through the second fuel circuit 42B and its fuel conduits 46B and 48B, to second fuel injector 34B. The second fuel injector 34B may continue to inject the second fuel for mixing with (e.g., compressed) air. The second fuel injector 34B of FIG. 1, for example, may inject the second fuel into the combustion chamber 38. The second fuel-air mixture may be ignited within the combustion chamber 38. As described below in further detail, combustion of the second fuel-air mixture may be converted to provide aircraft thrust. Note, during this second mode of operation (the step 306), the first flow regulator 50A may prevent the first fuel from flowing from the first fuel source 30A to the first fuel injector 34A.

The method 300 and its steps may be performed during aircraft operation. The method 300 and its steps, for example, may facilitate switching fuels during aircraft flight. The aircraft and its pilot(s) may therefore switch between fuels based on geographic location, flight status, flight conditions, fuel status and/or various other parameters on-the-fly.

When the method 300 is performed during aircraft flight, at least one other aircraft engine (e.g., for a dual engine aircraft) may continue to be operated while the engine is shutdown during the switching step 304. The aircraft may thereby continue to receive uninterrupted thrust while switching the fuel supply 22 for the engine. Of course, following performance of the method 300 for the engine to switch fuel, the same or a similar method may subsequently be performed for the other engine(s) to facilitate switching its fuel source. Each aircraft propulsion system engine for the aircraft may thereby be switched from the first fuel to the second fuel, or vice versa, in a staggered fashion.

The switching step 304 may be initiated (e.g., manually) by an aircraft operator; e.g., a pilot. Alternatively, the switching step 304 may be initiated (e.g., automatically) by the controller 28 based on, for example, one or more parameters. Examples of such parameters include, but are not limited to, environmental conditions, aircraft performance requirements, aircraft altitude, etc. Where the switching step 304 is initiated by the controller 28, the aircraft operator may have (or may not have) a manual override to initiate or prevent initiation of the switching step 304.

The method 300 is described above for switching from the first fuel to the second fuel. This method 300, of course, may also or alternatively be performed to switch from the second fuel to the first fuel. For example, in step 302, the engine may be operated using the second fuel. In the step 304, the fuel supply 22 may be switched from the second fuel source 30B to the first fuel source 30A. In the step 306, the engine may be operated using the first fuel.

Figure 4:
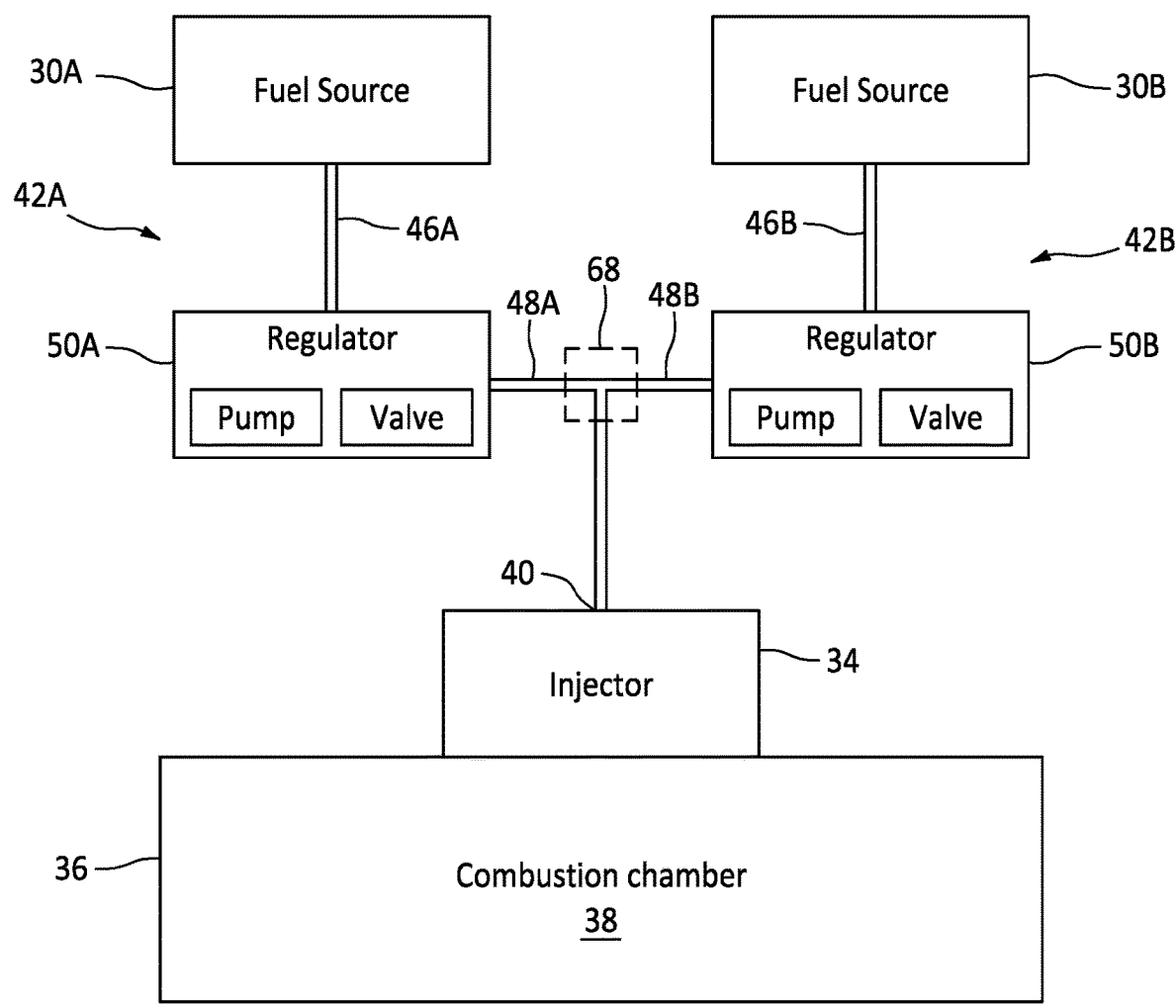
FIG. 4 is a schematic illustration of a fuel system for delivering fuel from a plurality of fuel sources to a common fuel injector.
Figure 5:
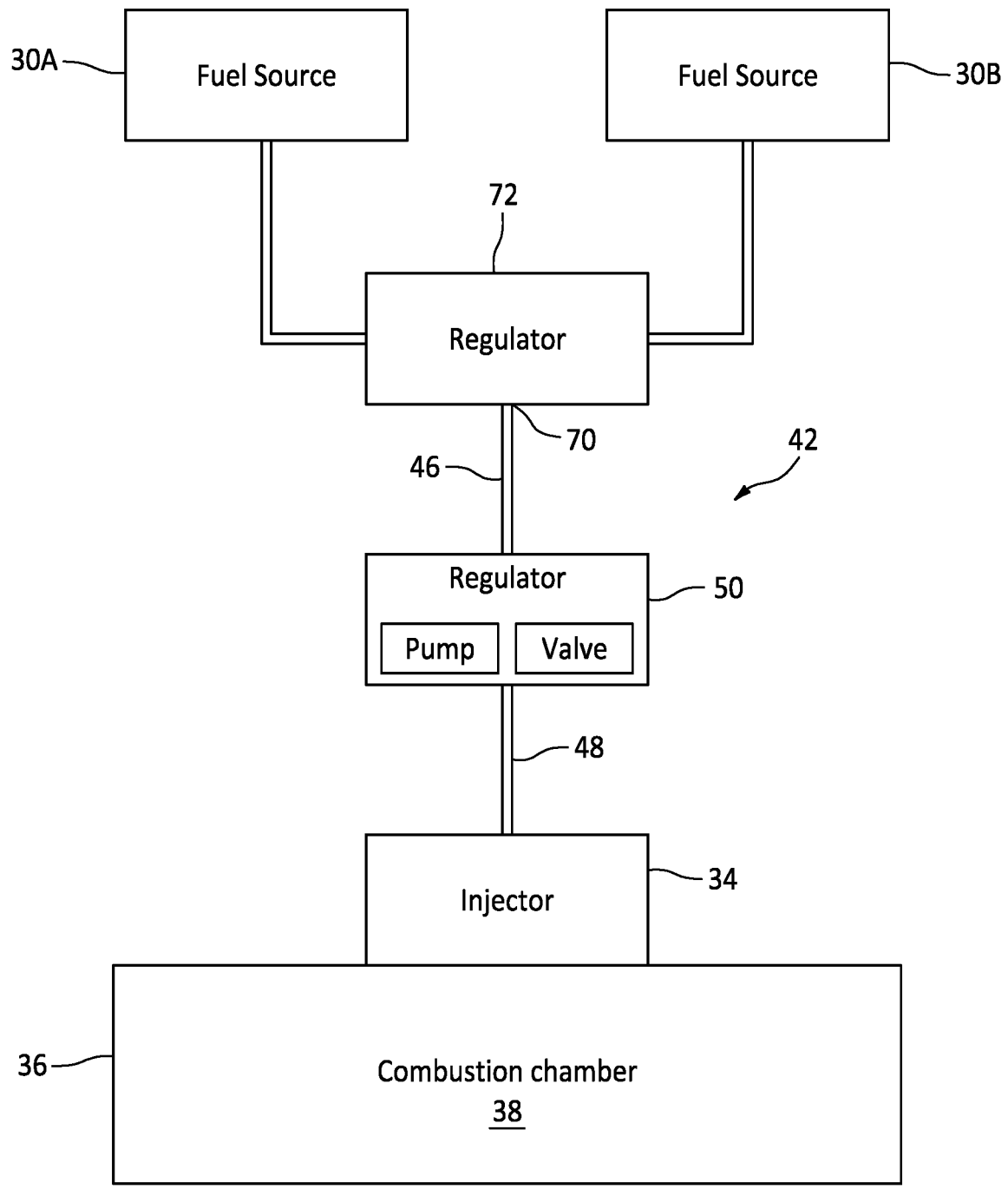
FIG. 5 is a schematic illustration of another fuel system for delivering fuel from a plurality of fuel sources to a common fuel injector.

In some embodiments, referring to FIG. 1, the first fuel circuit 42A and the second fuel circuit 42B are fluidly coupled with discrete fuel injectors 34. The first fuel injector 34A is configured to (e.g., only) inject the first fuel, and the second fuel injector 34B is configured to (e.g., only) inject the second fuel. In other embodiments, referring to FIG. 4, the first fuel circuit 42A and the second fuel circuit 42B may be fluidly coupled (e.g., in parallel) with at least one common fuel injector 34; e.g., the same fuel injector(s). Each of the downstream fuel conduits 48A and 48B of FIG. 4, for example, are fluidly coupled to the fuel injector inlet 40 in parallel. In such embodiments, the fuel system 26 may also include an additional fuel regulator 68 (e.g., a three-way valve) for selectively coupling the first fuel circuit 42A and/or the second fuel circuit 42B to the downstream fuel injector 34. In still other embodiments, referring to FIG. 5, the first fuel circuit 42A and the second fuel circuit 42B may be at least partially combined into a common fuel circuit 42; e.g., the same fuel circuit. The first fuel source 30A and/or the second fuel source 30B may be selectively fluidly coupled (e.g., in parallel) to an inlet 70 of the common fuel circuit 42 by an additional fuel regulator 72; e.g., a three-way valve. The present disclosure, however, is not limited to the foregoing exemplary fuel circuit configurations.

Figure 6:
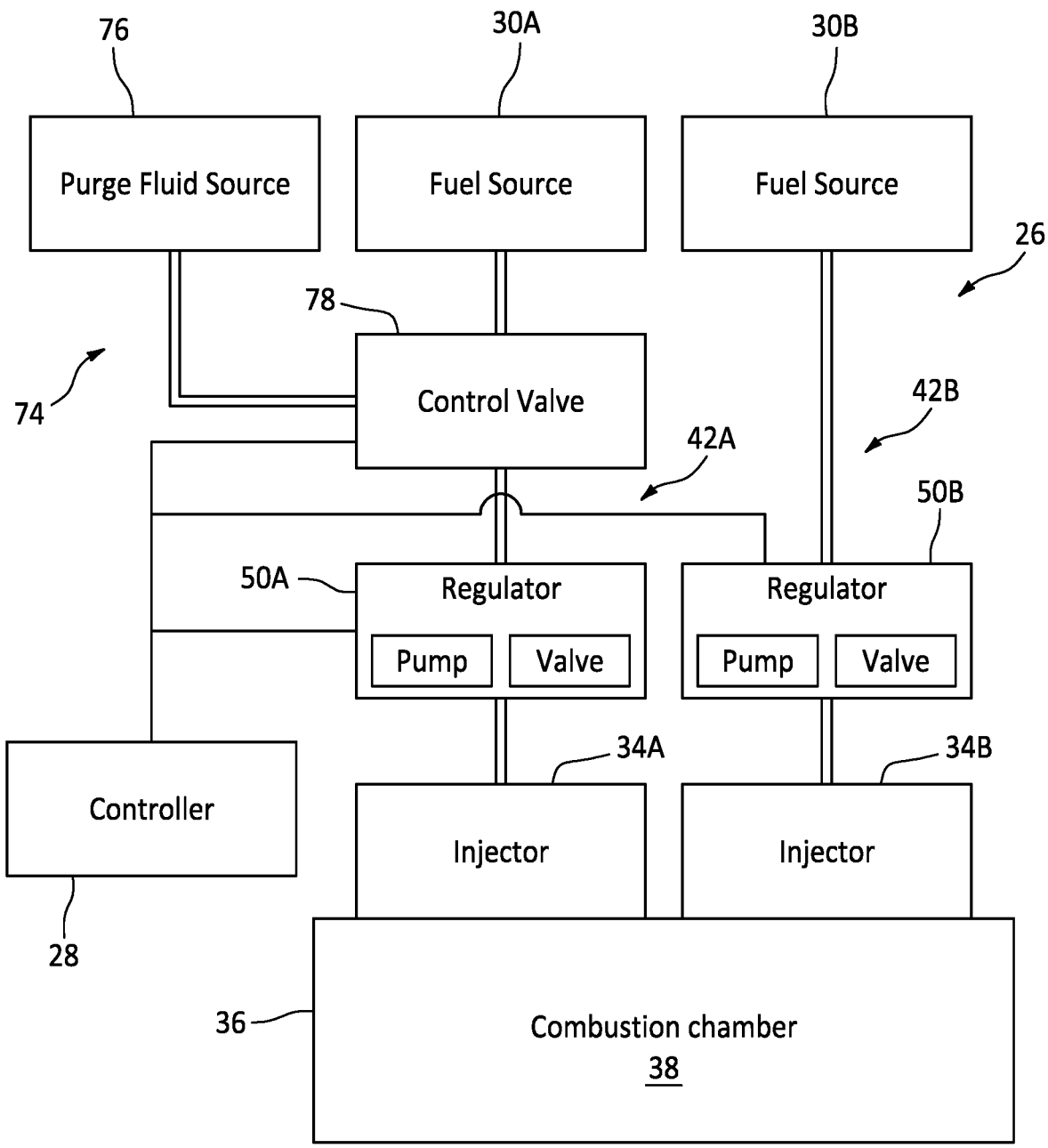
FIG. 6 is a schematic illustration of the aircraft system configured with a purge fluid system.

In some embodiments, referring to FIG. 6, the fuel system 26 may include a fuel purge system 74. This purge system 74 of FIG. 6 is configured with the first fuel circuit 42A to purge (e.g., evacuate) some or all of the first fuel out of the first fuel circuit 42A. The purge system 74 of FIG. 6, for example, includes a purge fluid source 76 and a control valve 78; e.g., a three-way valve. The purge fluid source 76 may be a reservoir such as, but not limited to, a tank, a cylinder, a pressure vessel, a bladder or any other fluid container. This purge fluid source 76 is configured to contain and hold a quantity of purge fluid; e.g., an inert fluid such as inert gas. The control valve 78 is configured to selectively fluidly couple the purge fluid source 76 to the first fuel circuit 42A. The controller 28 of FIG. 6, for example, may signal the control valve 78 to (A) fluidly decouple the first fuel source 30A from the first fuel circuit 42A and/or (B) fluidly couple the purge fluid source 76 to the first fuel circuit 42A during the switching step 304. The control valve 78 may thereby direct the purge fluid from the purge fluid source 76 into and through the first fuel circuit 42A to (e.g., into and/or through) the respective fuel injector 34A. This flow of the purge fluid may purge (e.g., evacuate) any remaining first fuel from the first fuel circuit 42A (e.g., and the respective fuel injector 34A) following the stopping (e.g., blocking) the flow of the first fuel from the first fuel source 30A. Such a purge may prevent (or reduce likelihood of) the first fuel (particularly where the first fuel is a gaseous fuel such as, but not limited to, the hydrogen ($H_2$) gas) from slowly leaking into the combustion chamber 38 while operating the engine on the second fuel.

The fuel system 26 of FIG. 6 is shown with both the first flow regulator 50A and the control valve 78. However, in other embodiments, the first flow regulator 50A may be configured to also perform the function of the control valve 78, and the control valve 78 may be omitted (or, vice versa).

The purge system 74 of FIG. 6 is shown as (e.g., only) servicing the first fuel circuit 42A. However, in other embodiments, the purge system 74 may alternatively be configured to service the second fuel circuit 42B, or both the first fuel circuit 42A and the second fuel circuit 42B. In still other embodiments, the second fuel circuit 42B may be configured with its own dedicated purge system configured similar to the purge system 74 described above.

The switching step 304 may be performed (e.g., only) using one of the fuels at a time as described above. Alternatively, the switching step 304 may be performed where both the first fuel and the second fuel are concurrently delivered to the combustion chamber 38. Providing both fuels may facilitate restarting the engine/reigniting the combustor 36 where, for example, one of the fuels is difficult to initially ignite at a low power (e.g., a restart) condition. For example, where the second fuel is the hydrogen fuel (or where the switching occurs from the second fuel source 30B to the first fuel source 30A), a small flow of the first fuel (e.g., the hydrocarbon fuel) may be delivered to the combustion chamber 38 to provide a stable flame for igniting the second fuel. However, following engine restart, the flow of the first fuel may be terminated and the engine may (e.g., only) run off of the second fuel. Alternatively, the engine may be throttled down to idle for the fuel supply 22 switch rather than shut off the engine and then restart with both fuels. In other words, the first fuel may continue to flow to the combustor 36 while the second fuel is being initially delivered and ignited.

When using both fuels during the switching step 304, the controller 28 of FIG. 1 may receive feedback (e.g., sensor data) from one or more sensors 80 to monitor engine operation. The controller 28 may thereby monitor various engine parameters during the switching step 304 to identify any malfunctions (e.g., too much fuel being delivered to the combustor 36) which could lead to, for example, an overspeed condition. Examples of the engine parameters include, but are not limited to: inter-turbine temperature (ITT) between a high pressure (HP) turbine and a low pressure (LP) turbine; N1 shaft speed and/or rotor speed; and N2 shaft speed and/or rotor speed. The present disclosure, however, is not limited to the foregoing exemplary monitored engine parameters.

Figure 7A:
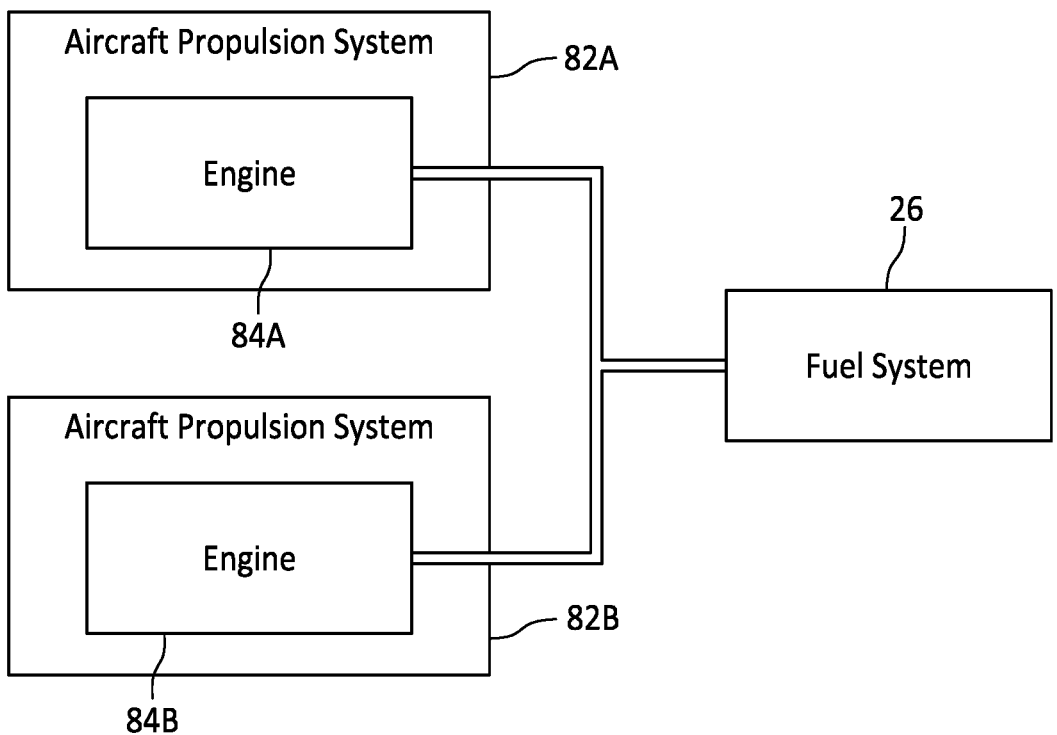
FIGS. 7A and 7B are schematic illustrations of various arrangements for delivering fuel to a plurality of aircraft propulsion systems.
Figure 7B:
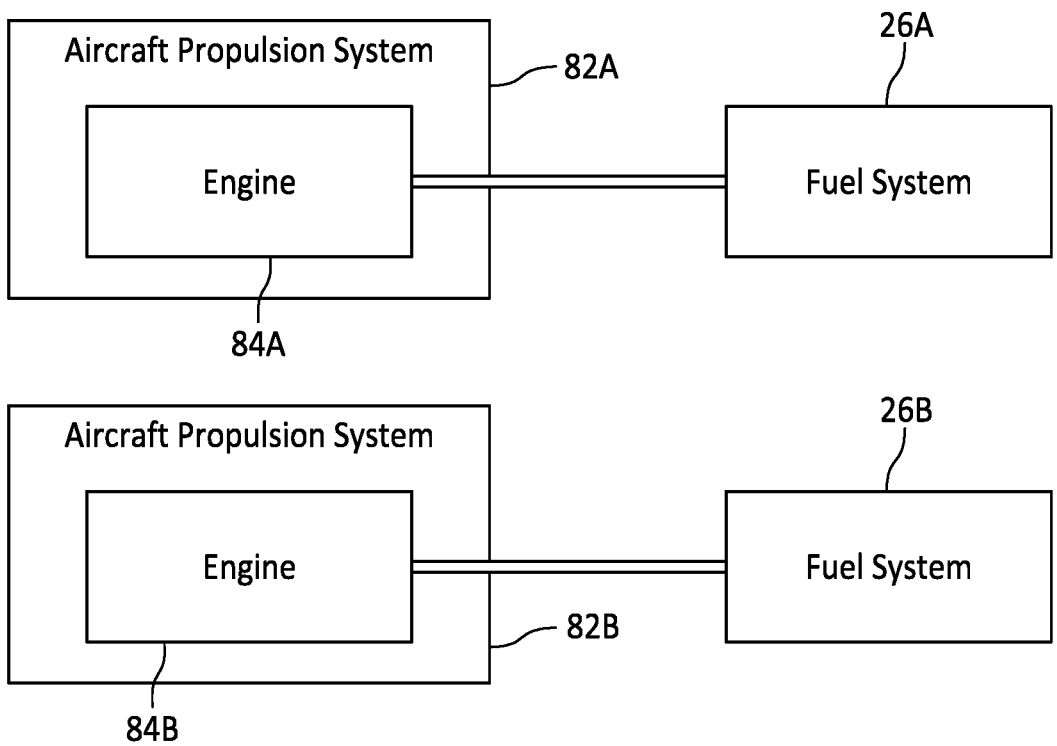

As described above, the aircraft may include more than one of the engines. The aircraft system 20 of FIGS. 7A and 7B, for example, includes a plurality of aircraft propulsion systems 82A and 82B (generally referred to as "82"). Each of these aircraft propulsion systems 82 includes a respective one of the engines 84A, 84B (generally referred to as "84"). Referring to FIG. 7A, the engines 84 may be serviced by a common fuel system 26; e.g., the same fuel system. Alternatively, referring to FIG. 7B, each of the engines 84 may be serviced by a respective (e.g., discrete) fuel system 26A, 26B (generally referred to as "26"). In either case, the fuel supply 22 to each engine 84 may be switched using the method 300. The switching, however, may be performed sequentially such that at least one of the engines (e.g., 84B or 84A)/the aircraft propulsion systems (e.g., 82B or 82A) is powering (e.g., providing thrust for) the aircraft during the temporary shutdown of the other one of the engines (e.g., 84A or 84B)/the aircraft propulsion systems (e.g., 82A or 82B) being switched.

If a fault occurs during the switching step 304, the aircraft system 20 may default to the previous fuel source (or to the more stable/reliable fuel source). For example, if a fault occurs while the fuel supply 22 to a respective engine is being switched from the second fuel source 30B to the first fuel source 30A (e.g., where the first fuel is the non-hydrocarbon fuel and the second fuel is the hydrocarbon fuel), the controller 28 may signal the fuel regulators 50 to stop and/or reverse the switch such that the engine 84 continues to operate using the second fuel. Examples of the fault include, but are not limited to: a fuel valve tracking fault; an open circuit fault; a closed circuit fault; a relatively high ITT; a relatively high N1; and a relatively high N2. A notice of such a fault(s) may be provided to the aircraft operator via, for example, an indicator device. Examples of an indicator device include, but are not limited to, a light, a gauge, a screen, a speaker, an alarm, a bell, etc.

Figure 8:
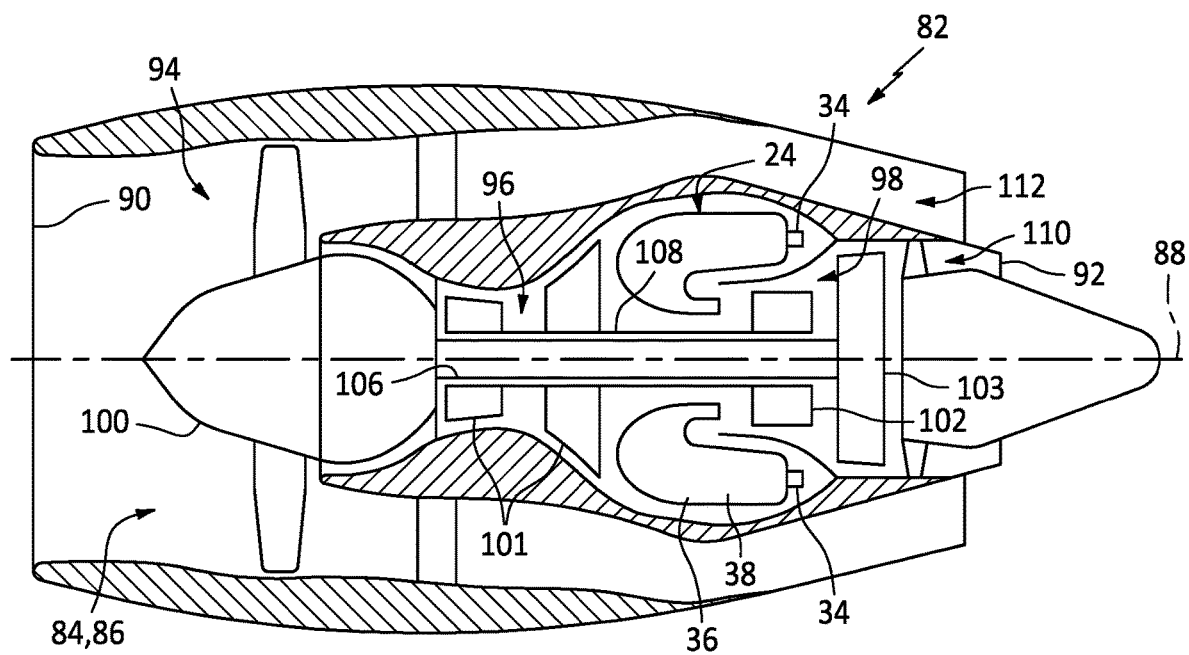
FIG. 8 is a schematic illustration of a turbofan turbine engine.

FIG. 8 illustrates an example of one of the engines 84. This engine 84 is configured as a gas turbine engine and, more particularly, a turbofan gas turbine engine 86. The turbine engine 86 of FIG. 8 extends along an axial centerline 88 of the turbine engine 86 between an upstream airflow inlet 90 and a downstream airflow exhaust 92. The turbine engine 86 includes a fan section 94, a compressor section 96, the combustion section 24 and a turbine section 98.

The fan section 94 includes a fan rotor 100. The compressor section 96 includes a compressor rotor 101. The turbine section 98 includes a high pressure turbine (HPT) rotor 102 and a low pressure turbine (LPT) rotor 103, where the LPT rotor 103 is configured as a power turbine rotor. Each of these rotors 100-103 includes a plurality of rotor blades arranged circumferentially around and connected to one or more respective rotor disks.

The fan rotor 100 is connected to the LPT rotor 103 through a low speed shaft 106. The compressor rotor 101 is connected to the HPT rotor 102 through a high speed shaft 108. The low speed shaft 106 extends through a bore of the high speed shaft 108 between the fan rotor 100 and the LPT rotor 103.

During operation, air enters the turbine engine through the airflow inlet 90. This air is directed through the fan section 94 and into a core flowpath 110 and a bypass flowpath 112. The core flowpath 110 extends sequentially through the engine sections 96, 24 and 98; e.g., an engine core. The air within the core flowpath 110 may be referred to as "core air". The bypass flowpath 112 extends through a bypass duct, which bypasses the engine core. The air within the bypass flowpath 112 may be referred to as "bypass air".

The core air is compressed by the compressor rotor 101 and directed into the (e.g., annular) combustion chamber 38 of the (e.g., annular) combustor 36 in the combustion section 24. Fuel is injected into the combustion chamber 38 via one or more of the fuel injectors 34 and mixed with the compressed core air to provide a fuel-air mixture. This fuel-air mixture is ignited and combustion products thereof flow through and sequentially cause the HPT rotor 102 and the LPT rotor 103 to rotate. The rotation of the HPT rotor 102 drives rotation of the compressor rotor 101 and, thus, compression of air received from an inlet into the core flowpath 110. The rotation of the LPT rotor 103 drives rotation of the fan rotor 100, which propels bypass air through and out of the bypass flowpath 112. The propulsion of the bypass air may account for a significant portion (e.g., a majority) of thrust generated by the turbine engine.

The aircraft system 20 may be configured with various turbine engines other than the one described above. The aircraft system 20, for example, may be configured with a geared turbine engine where a gear train connects one or more shafts to one or more rotors in a fan section, a compressor section and/or any other engine section. Alternatively, the aircraft system 20 may be configured with a turbine engine configured without a gear train. The aircraft system 20 may be configured with a geared or non-geared turbine engine configured with a single spool, with two spools (e.g., see FIG. 8), or with more than two spools. The turbine engine may be configured as a turbofan turbine engine, a turbojet turbine engine, a turboprop turbine engine, a turboshaft turbine engine or any other type of aircraft propulsion system turbine engine. The turbine engine may also or alternatively be configured to generate power for the aircraft; e.g., the turbine engine may be configured as an auxiliary power unit (APU).

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method for operating an aircraft system, comprising:
    operating an engine using first fuel provided by a first fuel source;
    switching a fuel supply for the engine between the first fuel source and a second fuel source, the switching of the fuel supply comprising shutting down the engine during aircraft flight such that a flame in an annular combustion chamber of the engine is extinguished, and the switching of the fuel supply further comprising
        operating a first flow regulator to stop flow of the first fuel from the first fuel source prior to the flame being extinguished; and
        operating a second flow regulator to start flow of the second fuel from the second fuel source after the flame being extinguished; and
    operating the engine using second fuel provided by the second fuel source.

2. The method of claim 1, wherein the engine is part of an aircraft propulsion system.

3. The method of claim 1, further comprising operating a second engine, the switching of the fuel supply for the engine performed while the second engine is operating.

4. The method of claim 1, wherein the switching of the fuel supply further comprises igniting the second fuel within a combustor of the engine.

5. The method of claim 1, wherein the switching of the fuel supply further comprises purging the first fuel from one or more components of the engine using a purge fluid that is different than the second fuel.

6. The method of claim 5, wherein the purge fluid comprises inert gas.

7. The method of claim 1, wherein
    one of the first fuel or the second fuel comprises gaseous fuel; and
    the other of the first fuel or the second fuel comprises liquid fuel.

8. The method of claim 1, wherein
    one of the first fuel or the second fuel comprises non-hydrocarbon fuel; and
    the other of the first fuel or the second fuel comprises hydrocarbon fuel.

9. The method of claim 1, wherein the first fuel or the second fuel comprises hydrogen fuel.

10. The method of claim 1, wherein the switching of the fuel supply is initiated by an operator.

11. The method of claim 1, wherein the switching of the fuel supply is initiated by a controller.

12. The method of claim 1, wherein the switching of the fuel supply comprises
    restarting the engine concurrently using the first fuel and the second fuel; and
    stopping flow of the first fuel following the restarting of the engine.

13. The method of claim 1, wherein
    a first fuel injector receives the first fuel from the first fuel source, and the first fuel injector directs the first fuel into the annular combustion chamber for combustion during the operating of the engine using the first fuel;
    a second fuel injector receives the second fuel from the second fuel source, and the second fuel injector directs the second fuel into the annular combustion chamber for combustion during the operating of the engine using the second fuel; and
    the first fuel injector is dedicated to the first fuel source, and the second fuel injector is dedicated to the second fuel source.

14. The method of claim 3, further comprising:
    operating the second engine using the first fuel while the fuel supply for the engine is switched between the first fuel source and the second fuel source; and
    switching the second engine from the first fuel to the second fuel, wherein the engine is operated using the second fuel during the switching of the second engine from the first fuel to the second fuel.

15. A method for operating an aircraft system, comprising:
    operating a first engine;
    operating a second engine using first fuel provided by a first fuel source;
    switching a fuel supply for the second engine between the first fuel source and a second fuel source while the first engine is operating, wherein a flame within an annular combustion chamber of the second engine is extinguished during the switching of the fuel supply,
    during the switching of the fuel supply, controlling a flow of the first fuel from the first fuel source such that the first fuel is stopped prior to the flame being extinguished, and controlling a flow of the second fuel from the second fuel source such that the second fuel is started after the flame being extinguished; and
    operating the second engine using second fuel provided by the second fuel source.

16. The method of claim 15, wherein the switching of the fuel supply for the second engine is performed while the first engine is operating using the first fuel.

17. The method of claim 15, wherein the switching of the fuel supply for the second engine comprises shutting down the second engine during aircraft flight.

18. A method for operating an aircraft system, comprising:
    operating a first engine using first fuel;
    operating a second engine using the first fuel;
    switching operation of the first engine from using the first fuel to second fuel, wherein a flame within a combustion chamber of the first engine is extinguished during the switching of the operation of the first engine, and wherein the second engine continues to operate using the first fuel during the switching of the operation of the first engine; and switching operation of the second engine from using the first fuel to the second fuel following the switching of the operation of the first engine, wherein a flame within a combustion chamber of the second engine is extinguished during the switching of the operation of the second engine, and wherein the first engine continues to operate using the second fuel during the switching of the operation of the second engine wherein during the switching of the fuel supply of the first engine or the second engine, controlling a flow of the first fuel from a first fuel source such that the first fuel is stopped prior to the flame being extinguished, and controlling a flow of the second fuel from a second fuel source such that the second fuel is started after the flame being extinguished.

19. The method of claim 18, wherein the combustion chamber of the first engine is an annular combustion chamber; and the combustion chamber of the second engine is an annular combustion chamber.

20. The method of claim 18, wherein at least one of during the switching of the operation of the first engine from using the first fuel to the second fuel, the flow of the second fuel to the first engine is started after the flow of the first fuel to the first engine is terminated; or during the switching of the operation of the second engine from using the first fuel to the second fuel, the flow of the second fuel to the second engine is started after the flow of the first fuel to the second engine is terminated.

* * * * *